United States Patent
Davis et al.

(10) Patent No.: US 12,246,822 B2
(45) Date of Patent: Mar. 11, 2025

(54) AIRCRAFT CONTROL SURFACE WITH INTEGRATED HYDRAULIC ACTUATOR

(71) Applicant: Rohr, Inc., Chula Vista, CA (US)

(72) Inventors: Jennifer Davis, La Jolla, CA (US); Karl Potier, Paris (FR); Raphael Medina, Ecouen (FR); Jerome Socheleau, Vernouillet (FR)

(73) Assignee: ROHR, INC., Chula Vista, CA (US)

( * ) Notice: Subject to any disclaimer, the term of this patent is extended or adjusted under 35 U.S.C. 154(b) by 130 days.

(21) Appl. No.: 18/091,826

(22) Filed: Dec. 30, 2022

(65) Prior Publication Data

US 2023/0211872 A1 Jul. 6, 2023

Related U.S. Application Data

(60) Provisional application No. 63/295,236, filed on Dec. 30, 2021.

(51) Int. Cl.
*B64C 13/36* (2006.01)
*B64C 9/00* (2006.01)
*F15B 15/14* (2006.01)

(52) U.S. Cl.
CPC .......... *B64C 13/36* (2013.01); *F15B 15/1447* (2013.01); *B64C 2009/005* (2013.01)

(58) Field of Classification Search
CPC ....... B64C 2009/005; B64C 9/02; B64C 9/32; B64C 9/323; B64C 9/326; B64C 13/36
See application file for complete search history.

(56) References Cited

U.S. PATENT DOCUMENTS

| | | | |
|---|---|---|---|
| 2,861,758 | A | 11/1958 | Howard |
| 4,595,158 | A | 6/1986 | Robinson |
| 4,773,620 | A | 9/1988 | Seidel |
| 2021/0061443 | A1 | 3/2021 | Dahl |
| 2021/0114714 | A1 | 4/2021 | Tsai |
| 2021/0317849 | A1 | 10/2021 | Mawle |

FOREIGN PATENT DOCUMENTS

| | | |
|---|---|---|
| DE | 3618776 C2 | 4/1989 |
| EP | 0176212 A1 | 4/1986 |

OTHER PUBLICATIONS

EP search report for EP22217218.1 dated May 4, 2023.

*Primary Examiner* — Nicholas McFall
(74) *Attorney, Agent, or Firm* — Getz Balich LLC

(57) ABSTRACT

An assembly is provided for an aircraft. This aircraft assembly includes an aircraft control surface and a hydraulic actuator. The hydraulic actuator includes a housing and a piston within the housing. The housing is formed integral with the aircraft control surface.

19 Claims, 5 Drawing Sheets

AIRCRAFT CONTROL SURFACE WITH INTEGRATED HYDRAULIC ACTUATOR

This application claims priority to U.S. Patent Appln. No. 63/295,236 filed Dec. 30, 2021, which is hereby incorporated herein by reference in its entirety.

BACKGROUND

1. Technical Field

This disclosure relates generally to an aircraft and, more particularly, to an aircraft control surface.

2. Background Information

An aircraft includes multiple aircraft control surfaces (also sometimes referred to as flight control surfaces) for controlling aircraft flight. Various types and configurations of aircraft control surfaces and actuators for moving these aircraft control surfaces are known in the art. While these known aircraft control surfaces and actuators have various benefits, there is still room in the art for improvement. There is a need in the art, for example, for lighter weight and/or more compact aircraft control surfaces and/or airfoils to which the aircraft control surfaces are connected.

SUMMARY OF THE DISCLOSURE

According to an aspect of the present disclosure, an assembly is provided for an aircraft. This aircraft assembly includes an aircraft control surface and a hydraulic actuator. The hydraulic actuator includes a housing and a piston within the housing. The housing is formed integral with the aircraft control surface.

According to another aspect of the present disclosure, another assembly is provided for an aircraft. This aircraft assembly includes an aircraft control surface and a hydraulic actuator. The hydraulic actuator includes a liner and a piston within an internal bore of the liner. The liner is embedded within and fixedly connected to the aircraft control surface.

According to still another aspect of the present disclosure, another assembly is provided for an aircraft. This aircraft assembly includes an aircraft control surface and a hydraulic actuator. The aircraft control surface includes a first skin, a second skin and a frame between and connected to the first skin and the second skin. The hydraulic actuator includes a housing and a piston within the housing. The housing is formed by the first skin, the second skin and the frame.

The hydraulic actuator may also include a housing configured as an integral part of the aircraft control surface. The liner may line an interior of the housing.

The aircraft control surface may include an exterior skin. The liner may engage and/or may be fixedly connected to the exterior skin.

The aircraft control surface may include an internal stiffener. The liner may engage and/or may be fixedly connected to the internal stiffener.

The hydraulic actuator may also include a hydraulic fluid passage extending through a sidewall of the liner to the internal bore.

The aircraft assembly may also include a second hydraulic actuator. The second hydraulic actuator may include a second liner and a second piston within an internal bore of the second liner. The second liner may be embedded within and/or may be fixedly connected to the aircraft control surface.

The aircraft control surface may be configured as or otherwise include an aileron.

The aircraft assembly may also include an airfoil. The aircraft control surface may be pivotally connected to the airfoil. The hydraulic actuator may also include a drive shaft. The drive shaft may be connected to the piston and/or may be motively coupled with the airfoil.

The aircraft control surface may include an exterior skin. A portion of the housing may be formed by the exterior skin.

The aircraft control surface may include an internal spar extending along a span of the aircraft control surface. A portion of the housing may be formed by the internal spar.

The aircraft control surface may include an internal stiffener extending along a camber line of the aircraft control surface. A portion of the housing may be formed by the internal stiffener.

The aircraft control surface may include a first skin, a second skin and a support structure between and connected to the first skin and the second skin. At least a portion of the housing may be collectively formed by the first skin, the second skin and the support structure.

The hydraulic actuator may also include a liner lining an interior of the housing. The piston may be disposed within an internal bore of the liner.

The liner may be fixedly connected to the housing.

The piston may be moveable within an internal bore of the hydraulic actuator. The hydraulic actuator may also include a hydraulic fluid passage extending through a sidewall of the housing to the internal bore.

The aircraft assembly may also include a second hydraulic actuator. The second hydraulic actuator may include a second housing and a second piston within the second housing. The second housing may be formed integral with the aircraft control surface.

The aircraft assembly may also include an airfoil. The aircraft control surface may be moveably connected to the airfoil. The hydraulic actuator may also include a drive element. The drive element may be connected to the piston and/or may be motively coupled with the airfoil.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
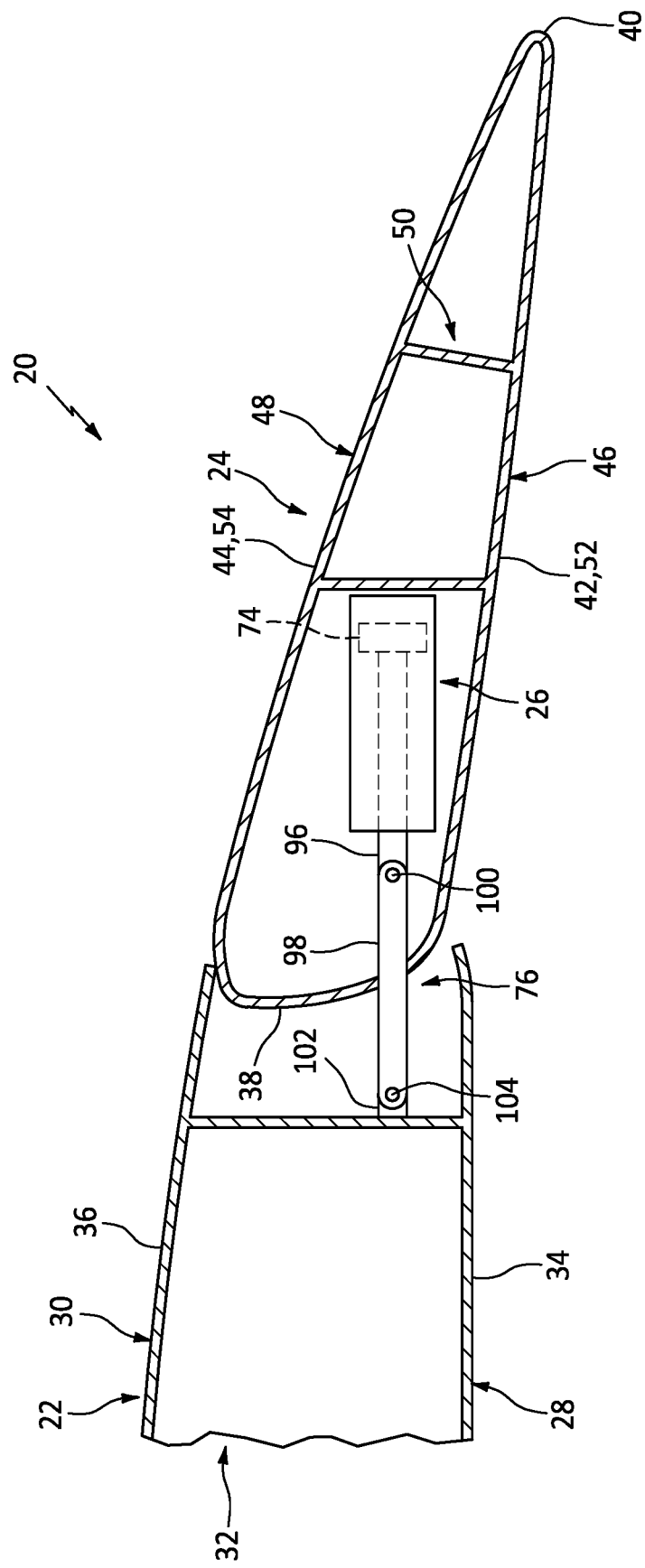
FIG. 1 is a diagrammatic illustration of a portion of an aircraft assembly with a hydraulic actuator schematically shown.

FIG. 1 illustrates an assembly 20 for an aircraft such as, but not limited to, an airplane. The aircraft assembly 20 includes a stationary aircraft base structure 22 and a moveable aircraft control surface 24, which may also be referred to as a flight control surface. The aircraft assembly 20 also includes one or more hydraulic actuators 26 (one schematically depicted in FIG. 1; see also FIG. 2) configured to move (e.g., pivot) the aircraft control surface 24 relative to the aircraft base structure 22.

The aircraft base structure 22 may be configured as an airfoil for the aircraft. The aircraft base structure 22 of FIG. 1, for example, is configured as an aircraft wing. The present disclosure, however, is not limited to such an exemplary aircraft base structure. The aircraft base structure 22, for example, may alternatively be configured as a horizontal stabilizer, a vertical stabilizer or any other member of the aircraft supporting an aircraft control surface.

The aircraft base structure 22 of FIG. 1 includes an exterior bottom skin 28, an exterior top skin 30 and an internal support structure 32. The base structure bottom skin 28 forms an exterior bottom aerodynamic flow surface 34 of the aircraft base structure 22. The base structure top skin 30 forms an exterior top aerodynamic flow surface 36 of the aircraft base structure 22. The base structure support structure 32 is arranged between the base structure bottom skin 28 and the base structure top skin 30. This base structure support structure 32 provides an internal rigid frame supporting the base structure bottom skin 28 and the base structure top skin 30. The base structure support structure 32 of FIG. 1 extends laterally between and is connected to the base structure bottom skin 28 and the base structure top skin 30. This base structure support structure 32 may include one or more internal spars, one or more internal stiffeners and/or one or more other structural members.

The aircraft control surface 24 is an aerodynamic body configured to adjust, maintain and/or otherwise control one or more flight parameters; e.g., altitude, pitch, roll, etc. The aircraft control surface 24 of FIG. 1, for example, is configured as an aileron. The present disclosure, however, is not limited to such an exemplary aircraft control surface. The aircraft control surface 24, for example, may alternatively be configured as an elevator, a flap, a rudder or any other flight control surface.

Figure 2:
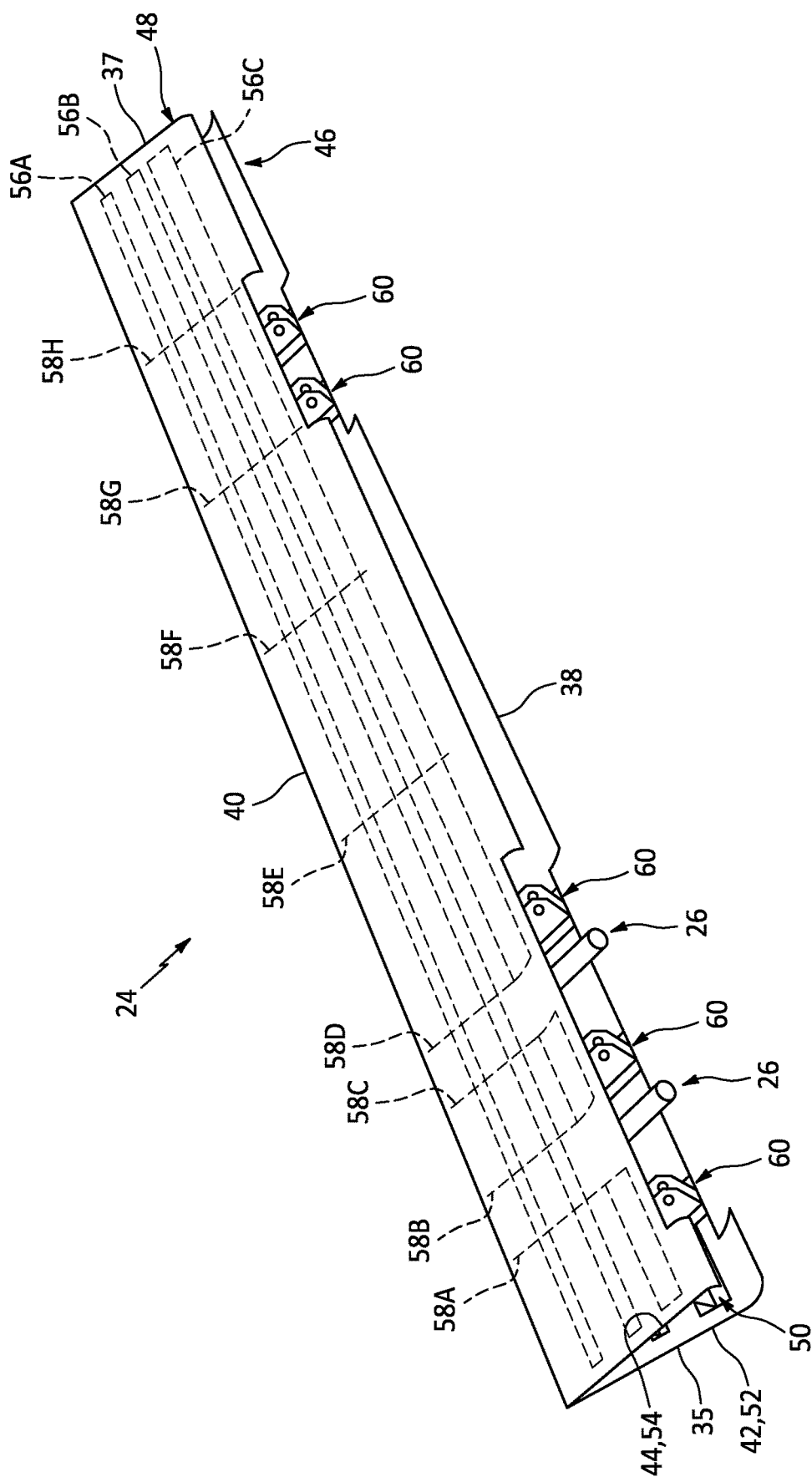
FIG. 2 is a perspective illustration of an aircraft control surface for the aircraft assembly configured with multiple hydraulic actuators partially shown.

Referring to FIG. 2, the aircraft control surface 24 extends spanwise along a span line between and to a first end 35 of the aircraft control surface 24 and a second end 37 of the aircraft control surface 24. The aircraft control surface 24 extends longitudinally along a camber line between and to a base 38 of the aircraft control surface 24 and a tip 40 (e.g., a trailing edge) of the aircraft control surface 24. The aircraft control surface 24 extends laterally between and to a bottom side 42 of the aircraft control surface 24 and a top side 44 of the aircraft control surface 24.

The aircraft control surface 24 of FIG. 2 includes a bottom skin 46, a top skin 48 and an internal support structure 50. The control surface bottom skin 46 forms an exterior bottom aerodynamic surface 52 of the aircraft control surface 24 at the control surface bottom side 42. This control surface bottom skin 46 extends spanwise between and to the control surface first end 35 and the control surface second end 37. The control surface bottom skin 46 extends longitudinally between and to the control surface base 38 and the control surface tip 40, where the control surface bottom skin 46 meets the control surface top skin 48 at the control surface tip 40.

The control surface top skin 48 forms an exterior top aerodynamic surface 54 of the aircraft control surface 24 at the control surface top side 44. This control surface top skin 48 extends spanwise between and to the control surface first end 35 and the control surface second end 37. The control surface top skin 48 extends longitudinally between and to the control surface base 38 and the control surface tip 40.

The control surface support structure 50 is arranged between the control surface bottom skin 46 and the control surface top skin 48. This control surface support structure 50 provides an internal rigid frame supporting the control surface bottom skin 46 and the control surface top skin 48. The control surface support structure 50 of FIG. 2, for example, includes one or more internal spars 56A-C (generally referred to as "56") and one or more internal stiffeners 58A-H (generally referred to as "58").

Each of the support structure elements 56 and 58 may extend laterally between and may engage (e.g., contact) the control surface bottom skin 46 and the control surface top skin 48. Each of the support structure elements 56 and 58 may also be connected to (e.g., formed integral with, or mechanically fastened, bonded and/or otherwise fixedly attached to) the control surface bottom skin 46 and/or the control surface top skin 48. Each of the internal spars 56 of FIG. 2 extends spanwise along the control surface skins 46 and 48, for example between and to (or about) the control surface first end 35 and the control surface second end 37. Each of the internal stiffeners 58 of FIG. 2 extends longitudinally along the control surface skins 46 and 48, for example from (or about) the control surface base 38 towards (or to) the control surface tip 40.

Figure 3A:
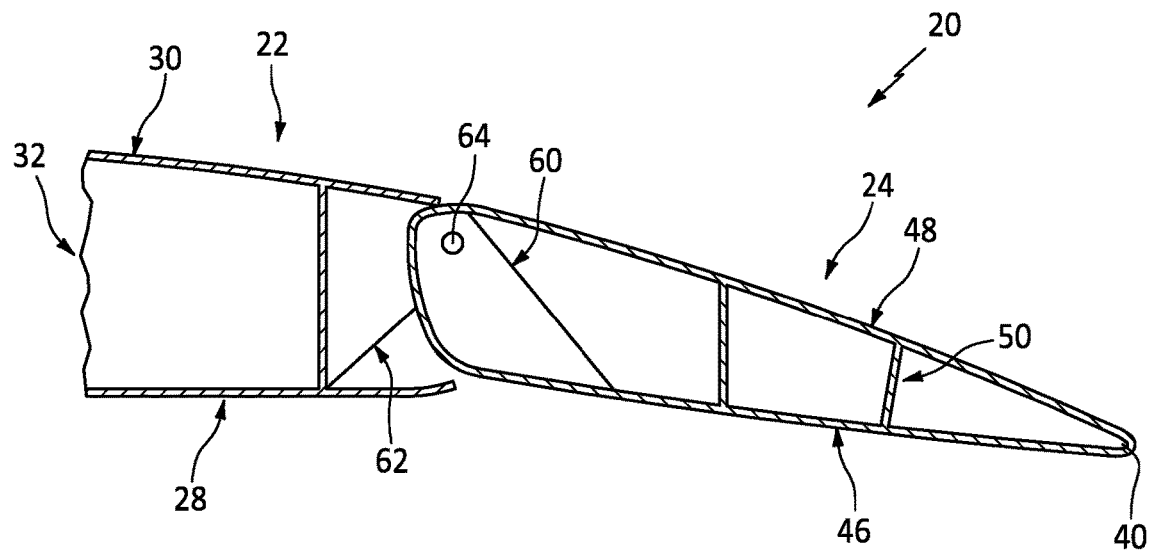
FIG. 3A is a diagrammatic illustration of a portion of the aircraft assembly with its aircraft control surface in a first position.
Figure 3B:
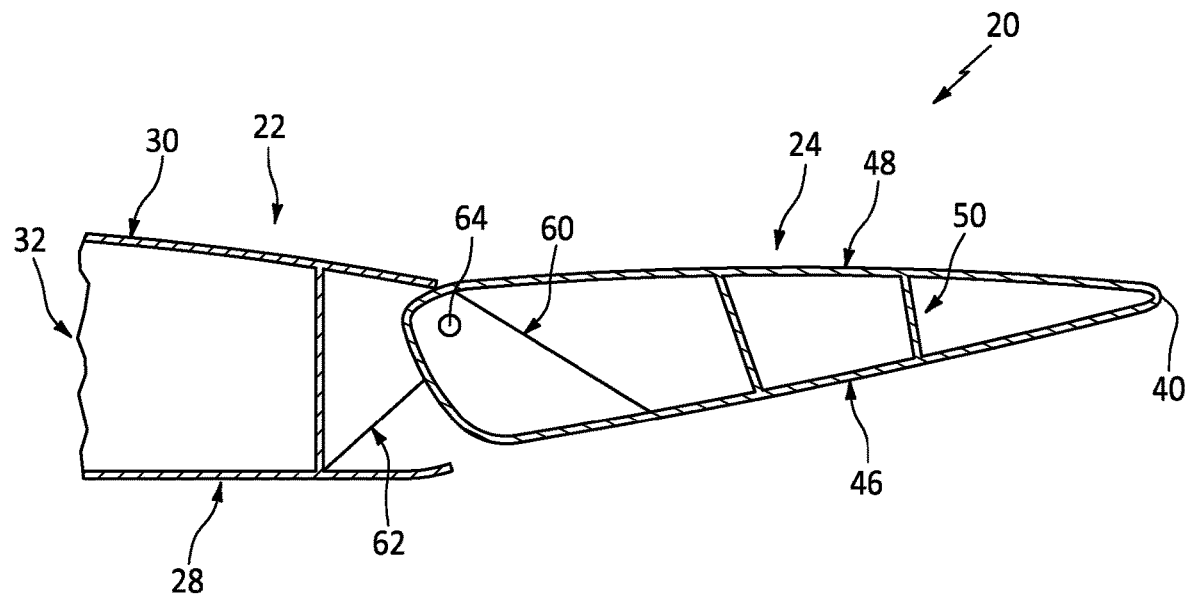
FIG. 3B is a diagrammatic illustration of a portion of the aircraft assembly with its aircraft control surface in a second position.

Referring to FIGS. 3A and 3B, the aircraft control surface 24 is moveably coupled with the aircraft base structure 22. The aircraft control surface 24 of FIG. 2, for example, includes one or more hinge mounts 60. Each control surface hinge mount 60 of FIGS. 3A and 3B is pivotally connected to a respective hinge mount 62 of the aircraft base structure 22 through a pivot connection 64; e.g., a pin connection. The aircraft control surface 24 may thereby pivot between a first position of FIG. 3A and a second position of FIG. 3B, or any intermediate position therebetween.

Figure 4:
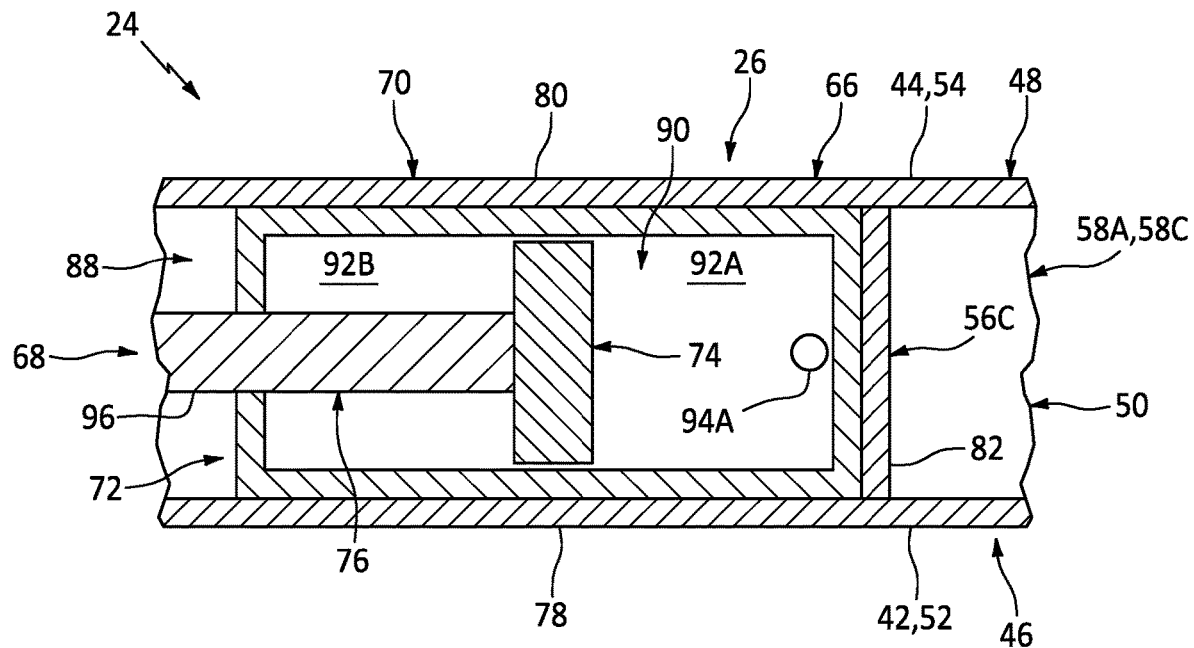
FIG. 4 is a side sectional illustration of a portion of an exemplary one of the hydraulic actuators configured integral with the aircraft control surface.
Figure 5:
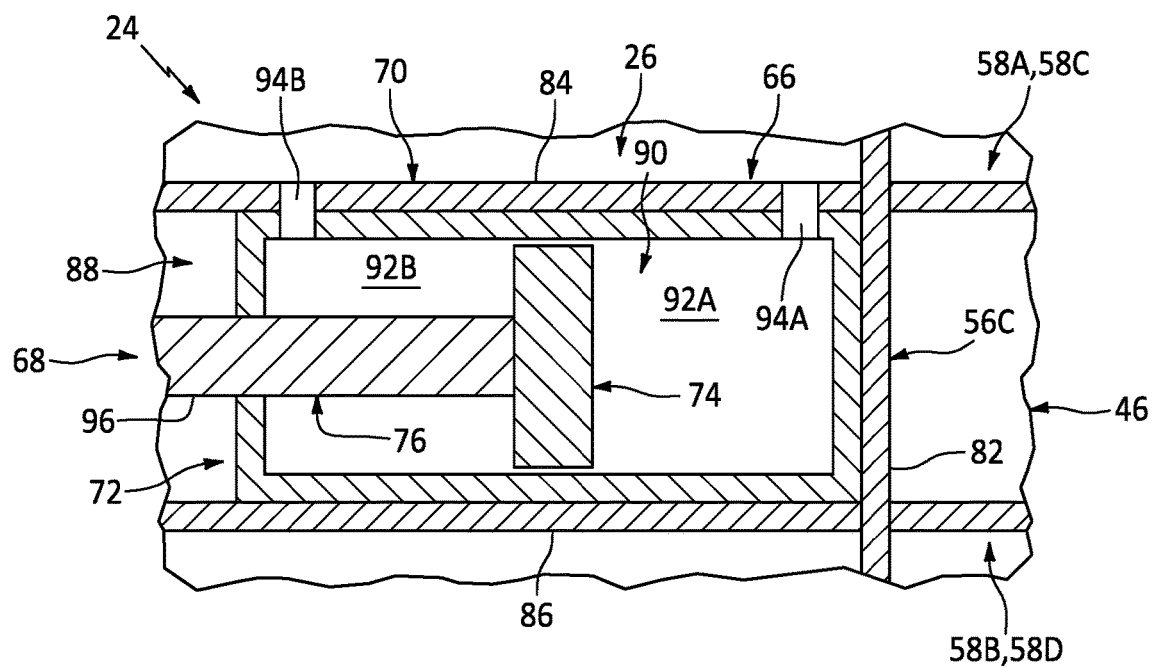
FIG. 5 is a cross-sectional illustration of a portion of the exemplary hydraulic actuator configured integral with the aircraft control surface.

Referring to FIGS. 4 and 5, each hydraulic actuator 26 includes a stationary structure 66 and a moveable structure 68. The actuator stationary structure 66 of FIGS. 4 and 5 includes an actuator housing 70 and an internal actuator liner 72. The actuator moveable structure 68 of FIGS. 4 and 5 includes an actuator piston 74 and an actuator driver 76.

The actuator housing 70 may be formed integral with the aircraft control surface 24. The actuator housing 70, more particularly, may be configured as a part of the aircraft control surface 24 and its control surface elements 46, 48, 56 and 58. The control surface bottom skin 46 of FIG. 4, for example, at least partially or completely forms a bottom side 78 of the actuator housing 70. The control surface top skin 48 at least partially or completely forms a top side 80 of the actuator housing 70. The control surface spar 56C at least partially or completely forms an internal end 82 of the actuator housing 70. A respective one of the control surface stiffeners 58A, 58C of FIG. 5 forms a first side 84 of the actuator housing 70. Another respective one of the control surface stiffeners 58B, 58D forms a second side 86 of the actuator housing 70.

The actuator housing 70 of FIGS. 4 and 5 includes an internal chamber 88. This internal chamber 88 of FIG. 5 extends spanwise within the actuator housing 70/the aircraft control surface 24 between and to the housing first side 84 and the housing second side 86. The internal chamber 88 of FIGS. 4 and 5 projects longitudinally into the actuator housing 70/the aircraft control surface 24 from the control surface base 38 (see FIG. 2) to the housing internal end 82. The internal chamber 88 of FIG. 4 extends laterally within the actuator housing 70/the aircraft control surface 24 between and to the housing bottom side 78 and the housing top side 80.

The actuator liner 72 is embedded within the actuator housing 70. More particularly, the actuator liner 72 is arranged within and at least partially (or completely) lines the internal chamber 88. The actuator liner 72 is fixedly connected to the actuator housing 70/the aircraft control surface 24 such that, for example, the actuator liner 72 is immovable relative to the actuator housing 70/the aircraft control surface 24. The actuator liner 72, for example, may be interference fit with, bonded to and/or otherwise attached to the actuator housing 70. The actuator liner 72 of FIGS. 4 and 5 is configured as a hydraulic cylinder (or a sleeve) for the actuator piston 74. This actuator liner 72 has an internal bore which at least partially completely forms an internal cavity 90 of the hydraulic actuator 26.

Figure 6A:
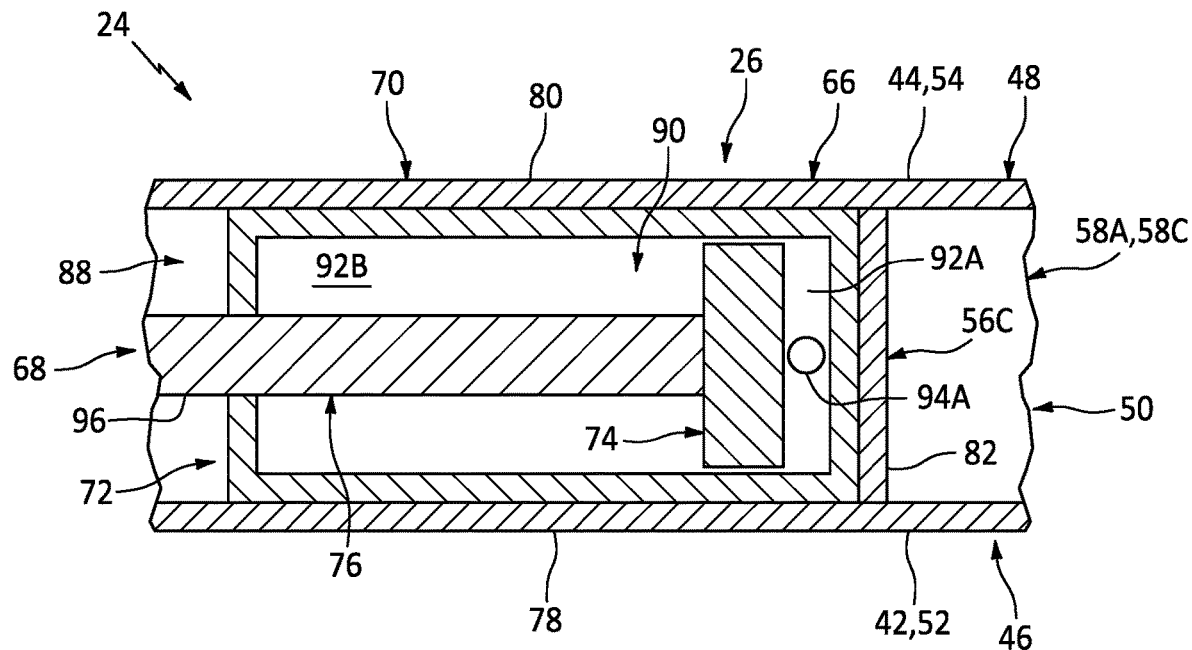
FIG. 6A is a side sectional illustration of a portion of the exemplary hydraulic actuator with its piston in a first position.
Figure 6B:
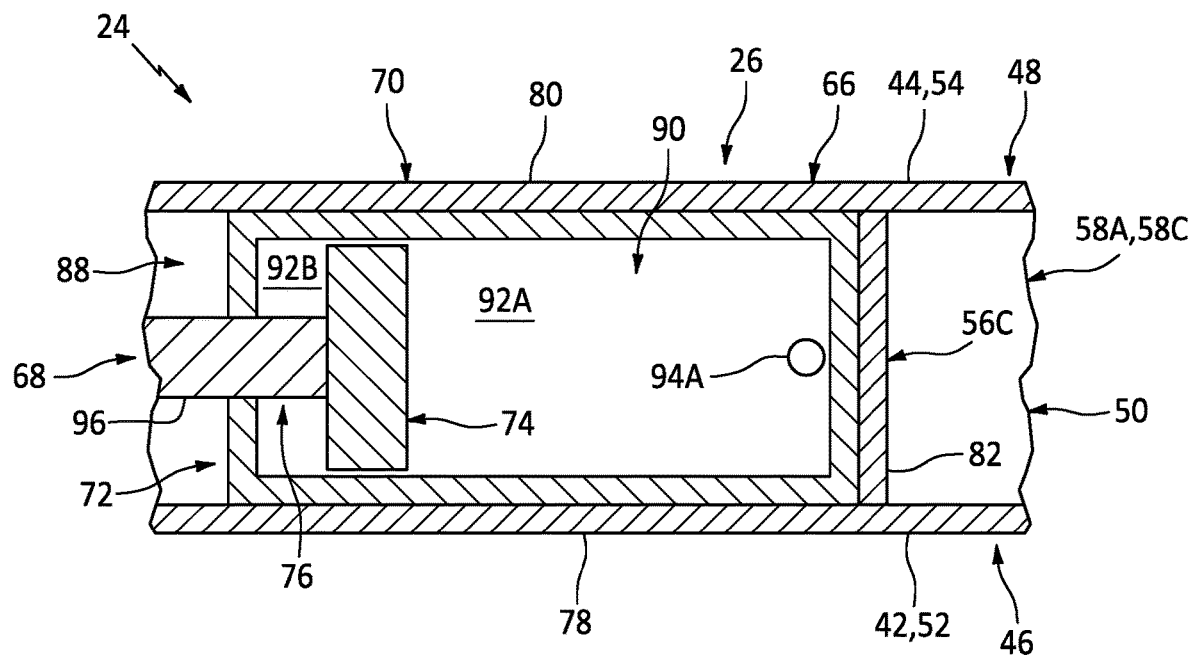
FIG. 6B is a side sectional illustration of a portion of the exemplary hydraulic actuator with its piston in a second position.

The actuator piston 74 is arranged within the internal bore and the internal cavity 90. The actuator piston 74 is configured to move axially within the internal cavity 90 along an axial centerline of the hydraulic actuator 26 between a first (e.g., retracted) position of FIG. 6A (e.g., corresponding to surface portion of FIG. 3A) and a second (e.g., extended) position of FIG. 6B (e.g., see corresponding to surface position of FIG. 3B), or any axial position therebetween. The actuator piston 74 of FIG. 5 fluidly divides the internal cavity 90 into a first sub-cavity 92A and a second sub-cavity 92B. The first sub-cavity 92A is fluidly coupled with a first hydraulic fluid passage 94A through a sidewall of the actuator housing 70 and a sidewall of the actuator liner 72, which first hydraulic fluid passage 94A is fluidly coupled with a conduit (not shown). The second sub-cavity 92B is fluidly coupled with a second hydraulic fluid passage 94B through the housing sidewall and the liner sidewall, which second hydraulic fluid passage 94B is fluidly coupled with a conduit (not shown). To move the actuator piston 74 from its first position of FIG. 6A to its second position of FIG. 6B, hydraulic fluid may be directed (e.g., pumped) into the first sub-cavity 92A through the first hydraulic fluid passage 94A and extracted (e.g., drawn out) from the second sub-cavity 92B through the second hydraulic fluid passage 94B (see FIG. 5). To move the hydraulic actuator 26 from its second position of FIG. 6B to its first position of FIG. 6A, the hydraulic fluid may be directed (e.g., pumped) into the second sub-cavity 92B through the second hydraulic fluid passage 94B (see FIG. 5) and extracted (e.g., drawn out) from the first sub-cavity 92A through the first hydraulic fluid passage 94A.

The actuator driver 76 of FIG. 1 may include an actuator ram 96 (e.g., a shaft) and an actuator linkage 98; e.g., a fixed length link such as a tie rod. The actuator ram 96 is connected to the actuator piston 74. The actuator ram 96 projects axially out from the actuator piston 74 along the axial centerline to a distal end of the actuator ram 96. The actuator ram 96 is motively coupled to the aircraft base structure 22. The actuator ram 96 of FIG. 1, for example, is moveably coupled to the base structure support structure 32 through the actuator linkage 98. More particularly, the actuator ram 96 is pivotally connected to the actuator linkage 98 at (e.g., on, adjacent or proximate) the ram distal end and/or a first end of the actuator linkage 98 through a pivot connection 100; e.g., a pin connection. The actuator linkage 98 is pivotally connected to a (e.g., stationary) mount 102 of the base structure support structure 32 at a second end of the actuator linkage 98 through a pivot connection 104; e.g., a pin connection. The present disclosure, however, is not limited to such an exemplary actuator driver configuration. For example, in other embodiments, the actuator driver 76 may include one or more additional drive elements and/or the actuator linkage 98 may be omitted.

With the foregoing arrangement, complexity and/or weight of the aircraft assembly 20 may be reduced as compared to another system where an actuator is a discrete severable component from an aircraft control surface. Furthermore, integrating the hydraulic actuator 26 into the aircraft control surface 24 may facilitate providing the aircraft base structure 22 and/or the aircraft control surface 24 with smaller dimensions and, thus, a more compact and/or lightweight form.

The aircraft assembly 20 is described above using the terms bottom and top with reference to the orientation in the drawings for ease of description. The aircraft assembly 20 of the present disclosure, however, is not limited to any particular spatial orientations relative to gravity. For example, in other embodiments, the skin 46 may be gravitationally above the skin 48. In still other embodiments, the skins 46 and 48 may be gravitationally next to each other; e.g., the aircraft assembly 20 of FIG. 1 may be rotated ninety degrees.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft, comprising:
   an aircraft control surface; and
   a hydraulic actuator including a housing and a piston within the housing, the housing formed integral with the aircraft control surface;
   wherein the aircraft control surface comprises an internal stiffener extending along a camber line of the aircraft control surface, a portion of the housing is formed by the internal stiffener, and the internal stiffener extends longitudinally from a base of the aircraft control surface to a tip of the aircraft control surface.

2. The assembly of claim 1, wherein
   the aircraft control surface comprises an exterior skin; and
   a portion of the housing is formed by the exterior skin.

3. The assembly of claim 1, wherein
   the aircraft control surface further comprises an internal spar extending along a span of the aircraft control surface; and
   a portion of the housing is formed by the internal spar.

4. The assembly of claim 1, wherein
the aircraft control surface includes a first skin, a second skin and a support structure between and connected to the first skin and the second skin; and
at least a portion of the housing is collectively formed by the first skin, the second skin and the support structure, wherein the support structure includes the internal stiffener.

5. The assembly of claim 1, wherein
the hydraulic actuator further includes a liner lining an interior of the housing;
the piston is disposed within an internal bore of the liner.

6. The assembly of claim 5, wherein the liner is fixedly connected to the housing.

7. The assembly of claim 1, wherein
the piston is moveable within an internal bore of the hydraulic actuator;
the hydraulic actuator further includes a hydraulic fluid passage extending through a sidewall of the housing to the internal bore.

8. The assembly of claim 1, further comprising:
a second hydraulic actuator including a second housing and a second piston within the second housing;
the second housing formed integral with the aircraft control surface.

9. The assembly of claim 1, wherein the aircraft control surface comprises an aileron.

10. The assembly of claim 1, further comprising:
an airfoil;
the aircraft control surface moveably connected to the airfoil;
the hydraulic actuator further including a drive element; and
the drive element connected to the piston and motively coupled with the airfoil.

11. An assembly for an aircraft, comprising:
an aircraft control surface; and
a hydraulic actuator including a housing, a liner and a piston within an internal bore of the liner, the liner embedded within and fixedly connected to the aircraft control surface;
wherein the aircraft control surface comprises an internal stiffener extending along a camber line of the aircraft control surface, the internal stiffener defines a portion of the housing, and the internal stiffener extends longitudinally from a base of the aircraft control surface to a tip of the aircraft control surface.

12. The assembly of claim 11, wherein
the housing is configured as an integral part of the aircraft control surface; and
the liner lines an interior of the housing.

13. The assembly of claim 11, wherein
the aircraft control surface comprises an exterior skin; and
the liner engages and is fixedly connected to the exterior skin.

14. The assembly of claim 11, wherein
the liner engages and is fixedly connected to the internal stiffener.

15. The assembly of claim 11, wherein the hydraulic actuator further includes a hydraulic fluid passage extending through a sidewall of the liner to the internal bore.

16. The assembly of claim 11, further comprising:
a second hydraulic actuator including a second liner and a second piston within an internal bore of the second liner;
the second liner embedded within and fixedly connected to the aircraft control surface.

17. The assembly of claim 11, wherein the aircraft control surface comprises an aileron.

18. The assembly of claim 11, further comprising:
an airfoil;
the aircraft control surface pivotally connected to the airfoil;
the hydraulic actuator further including a drive shaft; and
the drive shaft connected to the piston and motively coupled with the airfoil.

19. An assembly for an aircraft, comprising:
an aircraft control surface including a first skin, a second skin and a frame between and connected to the first skin and the second skin; and
a hydraulic actuator including a housing and a piston within the housing, the housing formed by the first skin, the second skin and the frame;
wherein the aircraft control surface comprises an internal stiffener extending along a camber line of the aircraft control surface, a portion of the housing is formed by the internal stiffener, and the internal stiffener extends longitudinally from a base of the aircraft control surface to a tip of the aircraft control surface.

* * * * *